United States Patent [19]
Peacock et al.

[11] 3,803,821
[45] Apr. 16, 1974

[54] SELF-ADJUSTING CROP DEFLECTOR

[75] Inventors: Peter J. Peacock, Memphis, Tenn.;
Thomas J. Scarnato, Barrington, Ill.

[73] Assignee: International Harvester Company, Chicago, Ill.

[22] Filed: Jan. 18, 1973

[21] Appl. No.: 324,625

[52] U.S. Cl. .......................... 56/192, 56/DIG. 1
[51] Int. Cl. ......................................... A01d 75/00
[58] Field of Search ..................... 56/192, DIG. 1

[56] References Cited
UNITED STATES PATENTS

| | | | |
|---|---|---|---|
| 3,683,602 | 8/1972 | Scarnato et al. | 56/192 X |
| 3,224,177 | 12/1965 | Adee | 56/DIG. 1 |
| 3,039,256 | 6/1962 | Witt | 56/DIG. 1 |
| 3,100,367 | 8/1963 | Halls et al. | 56/DIG. 1 |

Primary Examiner—Hugh R. Chamblee
Assistant Examiner—J. N. Eskovitz
Attorney, Agent, or Firm—Dennis K. Sullivan; Floyd B. Harman

[57] ABSTRACT

A horizontally disposed crop deflector for a crop conditioning or windrowing machine wherein a stream of material is directed in an upward and rearward stream, the deflector being made of reinforced elastomer such as rubber or the like with preferably a cord insert. The deflector is curved downwardly and rearwardly and at its ends extends over converging shields which pivot about vertical axes and which warp the ends of the deflector upwardly when the shields are swung inwardly without adversely affecting the curvature of the intermediate portion which functions to deflect the crop downwardly.

6 Claims, 3 Drawing Figures

PATENTED APR 16 1974 3,803,821

SELF-ADJUSTING CROP DEFLECTOR

DISCUSSION OF THE PRIOR ART

In the prior art, rigid structures are utilized which require that the connections with the side shield be maintained tight and which are not self-adjusting. Cumbersome bolted assemblies are provided with costly slide adjustments which are difficult to adjust since the bolts and the deflector parts of such assemblies normally rust and are impacted with crop material. Unless the operator has the necessary tools in the field he cannot readily loosen and/or clean the parts for adjustment.

SUMMARY OF THE INVENTION

This invention concerns a deflector which functions to guide the crop material issuing in a directed stream in a downward and rearward direction to be laid in swaths or for aggregation in windrows by side shields or deflectors.

A specific object of the invention is to provide a novel top deflector of flexible elastomeric material which extends over the side shields and which will deform or warp over the side shields to accommodate adjustment of the side shields without requiring the loosening or resetting of the top deflector.

This and other objects and advantages inherent in and encompassed by the invention will become more apparent from the specification and the drawings, wherein.

DESCRIPTION OF THE INVENTION

Figure 1:
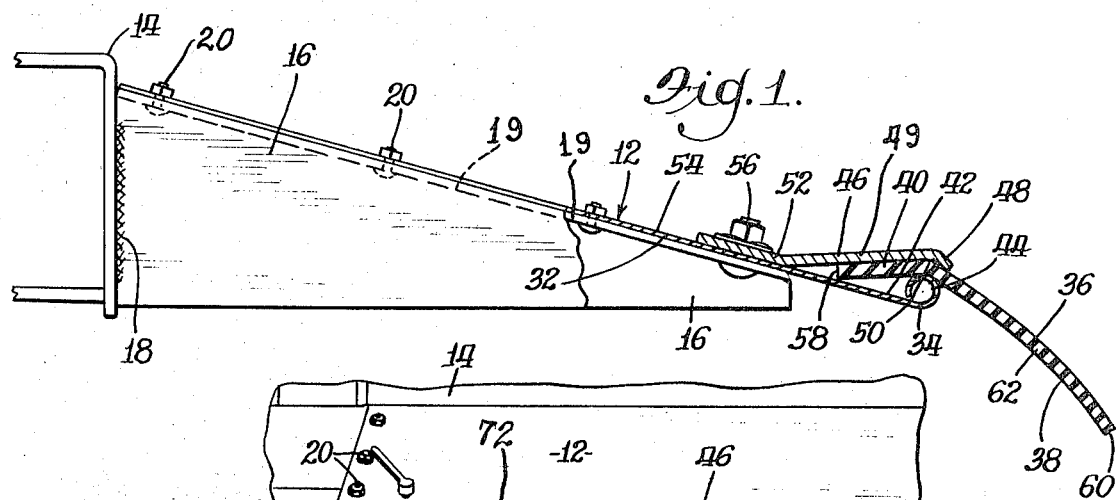
FIG. 1 is a side elevational view of a crop deflector assembly incorporating the invention.
Figure 2:
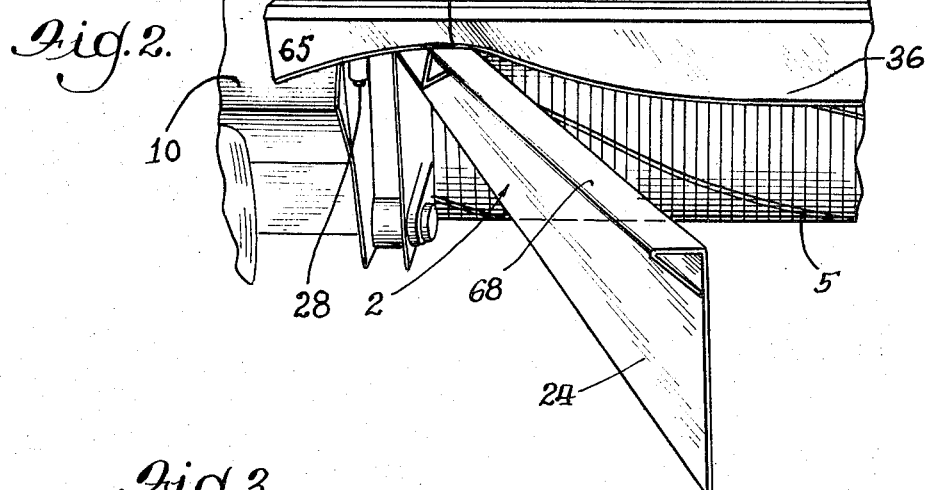
FIG. 2 is a fragmentary perspective view thereof.
Figure 3:
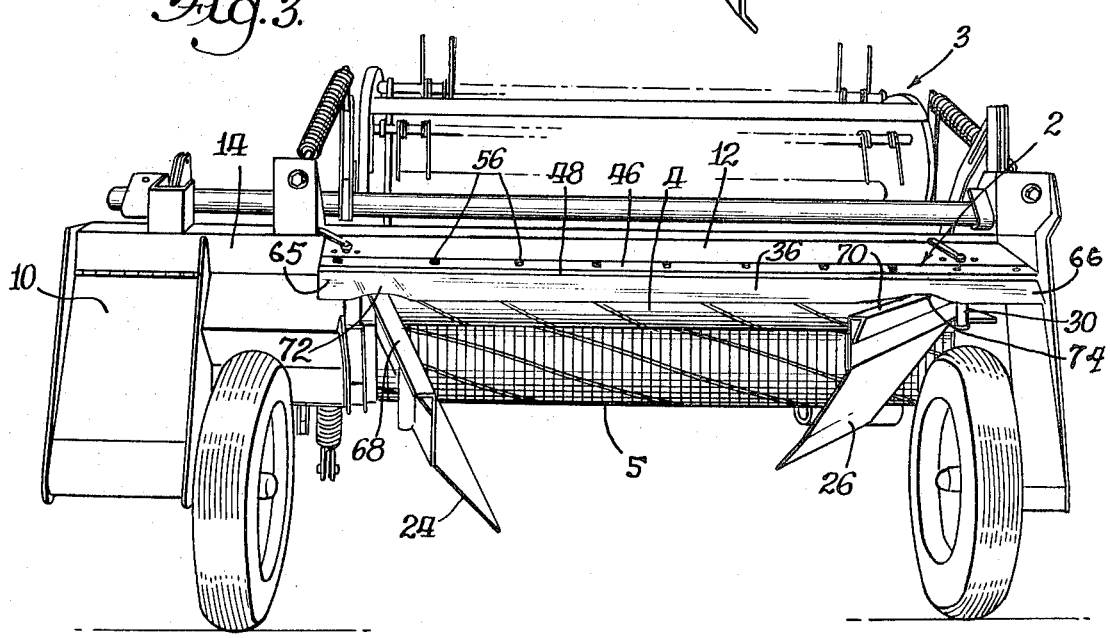
FIG. 3 is a further rear perspective view of the invention shown mounted on a crop conditioner.

Having specific reference to the drawings there is shown a crop windrowing device generally indicated 2 which is mounted in conventional manner on the rear end of a mower-conditioner 3 for controlling the deposition of a stream of crop material which exits from a pair of conditioning rollers 4 and 5.

The windrowing device 2 is mounted from a framework 10 of the mower-conditioner and comprises a downwardly and rearwardly sloping top shield 12 which is suitably secured to a transverse top frame member 14 of the framework 10 in intercepting relation to the stream of crops which generally issues in an upwardly and rearwardly flowing mass from the conditioning rollers 4 and 5. The shield 12 is connected at each end to a triangular gusset plate 16, which at its forward edge is welded at 18 to the beam member 14 and at its upper edge is provided with an inturned flange 19 which is bolted at 20 to the top shield 12.

The windrowing device or structure further comprises a pair of side shields 24 and 26 which are pivoted at their forward ends on vertical pivots or pins 28 and 30 which are suitably mounted on the framework 10 beneath the top shield 12 and swing inwardly and outwardly to converge the stream of crops into a windrow or allow it to fall in a wide swath, all as is well known in the art.

When the crop material strikes the underside 32 of the top shield, it tends indiscriminately to slide off the rear edge 34 of the shield. To alleviate this condition, a deflector 36 is provided to guide the crop downwardly between the side shields 24 and 26 for guidance thereby. The deflector of the present invention is formed of elastomeric material such as natural or synthetic rubber preferably reinforced by fabric and characterized as being of the nature of pneumatic vehicle tire carcass which is made of rubber and cotton, rayon or synthetic cord. The deflector 36 is an elongated strip of such material and made of one or more pieces extending lengthwise the full width of the top shield and curved transversely with its concave or cupped side 38 facing downwardly as shown in FIG. 1. The front edge portion 40 overlaps the rear edge portion 42 of the top shield 12 and is clamped between a rolled rear edge or bead 44 of the shield and an overlying retainer plate 46. The plate 46 has a downwardly angled rear flange portion 48 which merges with the body portion 49 of the plate 46 and forms a pocket 50 therewith disposed in vertical alignment with the bead 44. The forward edge flange portion 52 of the plate 46 lays against the upper side 54 of the top shield 12. Bolts 56 secure the front flange 52 against the top shield 12 and tightly clamp the flexible deflector 36 intermediate its front and rear longitudinal edges 58 and 60. The intermediate and rear part 62 of the deflector 36 extends behind the rear edge of the top shield 12 and curves downwardly below the lower surface 32 of the top shield 12 to intercept the material which slides off the rear edge 34 thereof. The material strikes the cupped or concave side 38 and is deflected downwardly between the side shields.

One feature of the invention is that the deflector is flexible such that in light fluffy material, the deflector flap 36 will hardly vibrate due to impacts of the crop material thereagainst. On the other hand clumps of material striking the deflector 36 will cause the flap to vibrate producing a slapping effect which will tend to break up the clump and loosen the crops so as to obtain a more fluffy aeriated windrow or swath. This flexibility further will inhibit the build-up of material on the lower side of the deflector.

Another important feature of the invention resides in extending the deflector 36 so that its ends 65 and 66 overlap the respective side shields 24 and 26 in the maximum separated positions thereof. The shields have upper formed wide edge portions 68, 70 to provide broad areas of engagement with the deflector 36. The deflector is locally warped or deformed as at 72, 74 upwardly in the areas of drape over and engagement with the respective side shields 24 and 26 while the intervening portion of the deflector remains curved downwardly. Thus no adjustment of the deflector 36 is necessary attendant or prior to adjustment of the lateral position of the side shields. Furthermore, the downward bias of the deflector 36 in the areas of engagement with the side shields tends to prevent them from destructively vibrating and working against their pivots.

It will be noted that various different embodiments of the invention will now become apparent to those skilled in the art and that the preferred embodiment is herein described and shown by way of illustration and not limitation.

What is claimed is:

1. In a crop harvester including a crop windrowing device having laterally adjustable side shields and a top shield and means associated with said crop harvester for delivery of a stream of crops to said windrowing device, the improvement comprising a flexible deflector attached at the rear edge of said top shield and extending downwardly and rearwardly therefrom, said deflector engagingly overlapping said side shields in all positions of adjustment thereof.

2. The invention according to claim 1 wherein the main portion of said deflector extends below the top of said shields and said deflector is locally upwardly deformed in the areas of engagement of said side shields.

3. The invention according to claim 1 wherein said deflector is made of elastomeric material.

4. The invention according to claim 3 wherein said elastomeric material is reinforced by fabric.

5. A windrowing device for a mower-conditioner comprising:

frame means;

a pair of laterally adjustable side shields pivotally attached at the forward ends thereof to said frame means;

a top shield secured to said frame means and extending rearwardly over said side shields; and a sheet-like flexible deflector attached to the rear portion of said top shield and extending downwardly and rearwardly therefrom, said deflector engagingly overlapping said side shields in all positions of adjustment thereof.

6. The windrowing device of claim 5 wherein said deflector is made of reinforced elastomeric material.

* * * * *